United States Patent [19]
Wortmann et al.

[11] Patent Number: 5,235,867
[45] Date of Patent: Aug. 17, 1993

[54] LOCKOUT MEANS FOR CABLE TENSION ADJUSTMENT

[75] Inventors: Martin J. Wortmann, Moberly; Tave E. Hass, Columbia; David L. Crossgrove, Moberly, all of Mo.

[73] Assignee: Orscheln Co., Moberly, Mo.

[21] Appl. No.: 774,250

[22] Filed: Oct. 10, 1991

[51] Int. Cl.$^5$ ............................................. F16C 1/10
[52] U.S. Cl. ................... 74/501.5 R; 74/536; 74/542
[58] Field of Search ............... 74/501.5 R, 541, 542, 74/536

[56] References Cited

U.S. PATENT DOCUMENTS

| | | | |
|---|---|---|---|
| 2,694,945 | 11/1954 | Jandus | 74/542 |
| 2,940,334 | 6/1960 | Koskela | 74/542 X |
| 3,002,394 | 10/1961 | Spisz | 74/542 X |
| 3,602,064 | 8/1971 | Francis | 74/501.5 R X |
| 4,512,210 | 4/1985 | Gurney | 74/501.5 R X |
| 4,515,036 | 5/1985 | Dotson | 74/501.5 R X |
| 4,612,823 | 9/1986 | De Leeuw et al. | 74/542 X |
| 4,841,798 | 1/1989 | Porter et al. | 74/501.5 R |
| 4,854,187 | 8/1989 | Walters | 74/501.5 R X |
| 4,872,368 | 10/1989 | Porter | 74/542 |
| 5,001,942 | 3/1991 | Boyer | 74/535 |
| 5,004,077 | 4/1991 | Carlson et al. | 74/501.5 R X |

FOREIGN PATENT DOCUMENTS

| | | | |
|---|---|---|---|
| 351131 | 1/1990 | European Pat. Off. | 74/501.5 R |
| 55-145050 | 11/1980 | Japan | 74/542 |
| 1-254456 | 10/1989 | Japan | 74/501.5 H |

Primary Examiner—Leslie A. Braun
Assistant Examiner—Andrea Pitts
Attorney, Agent, or Firm—Laubscher & Laubscher

[57] ABSTRACT

A cable tensioning system for removing slack from a parking brake cable or the like including an improved resettable holdout arrangement for retaining an adjuster ratchet in a spring-biased caged condition during transport and installation of the system in a vehicle. Three embodiments of the invention are characterized, respectively, by the use of an axially displaceable lockout pin that defines an abutment in the path of the adjuster ratchet, a lockout spring having an arm portion adapted to extend into a corresponding notch contained in the periphery of the adjuster ratchet, and a lockout pawl arrangement biased by a lockout spring for cooperation with the ratchet teeth.

11 Claims, 9 Drawing Sheets

LOCKOUT MEANS FOR CABLE TENSION ADJUSTMENT

STATEMENT OF THE INVENTION

This invention relates to improved lockout means for retaining the adjuster ratchet of an automatic cable tensioning system in an initial spring-biased caged condition for transport, installation in a vehicle, and connection with a parking brake cable or the like.

BRIEF DESCRIPTION OF THE PRIOR ART

Systems for automatically removing slack from a parking brake cable are well known in the patented prior art. For example, the Porter et al U.S. Pat. No. 4,841,798 discloses a foot-operated self-adjusting parking brake system having a removable restraining pin for initially locking the spring-biased adjuster ratchet in a caged condition. A similar cable tensioning system for a hand-operated cable-tensioning parking brake system is disclosed in the Boyer et al U.S. Pat. No. 5,001,942. Each of these patents is assigned to the same assignee as the present invention.

The known cable adjusting systems possess certain inherent drawbacks. For example, the original threaded cable adjuster is costly since it requires manual adjustment after installation, and systems with pull pins are difficult to reach and remove, and require discarding of a part at the assembly plant. Moreover the parking brake will not operate until the pin is removed. Systems of the type including shear pins must, on the one hand, be strong enough not to shear by accident, but, on the other hand, must be able to shear with minimum lever effort. Furthermore, retaining the sheared ends after actuation presents a problem.

The present invention was developed to provide an improved lockout arrangement that eliminates the need to find and remove a part, eliminates the cost of a discarded part, is automatically operated with initial brake application, and eliminates the possibility of producing a vehicle with an inoperable parking brake The improved system reduces the chance of inadvertent lockout actuation, provides consistent and lower actuation effort and travel, and eliminates potentially loose parts (such as shear pin parts, for example). Finally, the system affords resetting of the lockout means for service and/or testing of the parking brake arrangement.

SUMMARY OF THE INVENTION

Accordingly, a primary object of the present invention is to provide a lockout arrangement for an automatic cable tensioning system including improved lockout means for retaining an adjuster ratchet in an initial caged spring-biased condition for transport, installation in a vehicle, and connection with a parking brake cable or the like. Preferably, the lockout means are resettable for subsequent servicing of the parking brake system.

According to a more specific object of the invention, the lockout means comprises either a lockout pin that is axially shiftable between stop and released positions relative to an abutment surface on the adjuster ratchet, a spring arm that is displaceable relative to a corresponding slot contained in the periphery of the adjuster ratchet, or a spring-biased latchout pawl that engages the ratchet teeth. In each case, the latchout device is automatically de-activated in a non-destructive manner when cable tension exceeds the opposing tension of lockout spring means, thereby to permit resetting of the system.

BRIEF DESCRIPTION OF THE DRAWINGS

Other objects and advantages of the invention will become apparent from a study of the following specification, when viewed in the light of the accompanying drawings in which.

DETAILED DESCRIPTION

Figure 1:
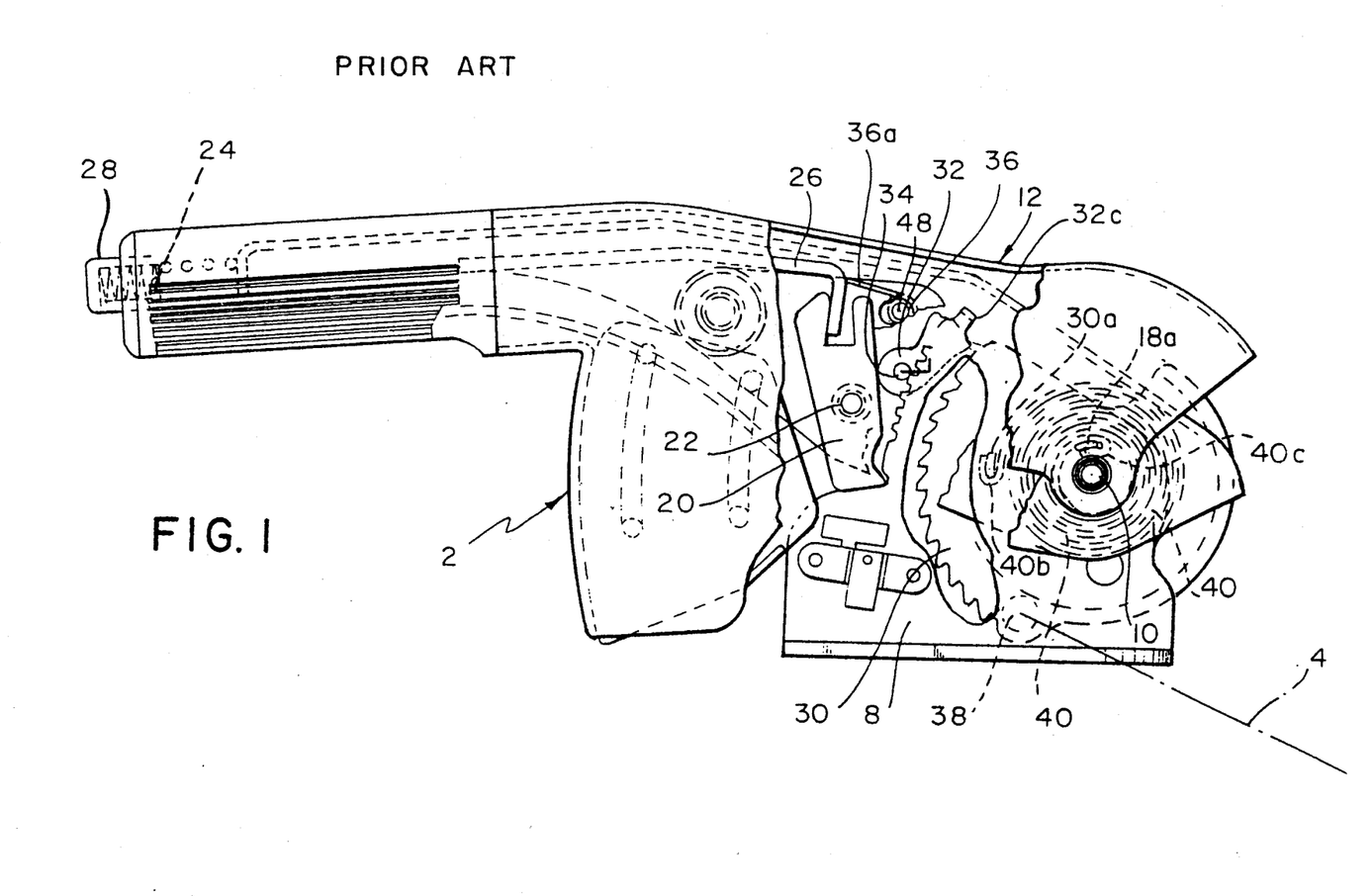
FIGS. 1 and 2 are side elevation and exploded views, respectively, of a prior art parking brake system of the hand-operated lever type including cable tension adjusting means.
Figure 2:
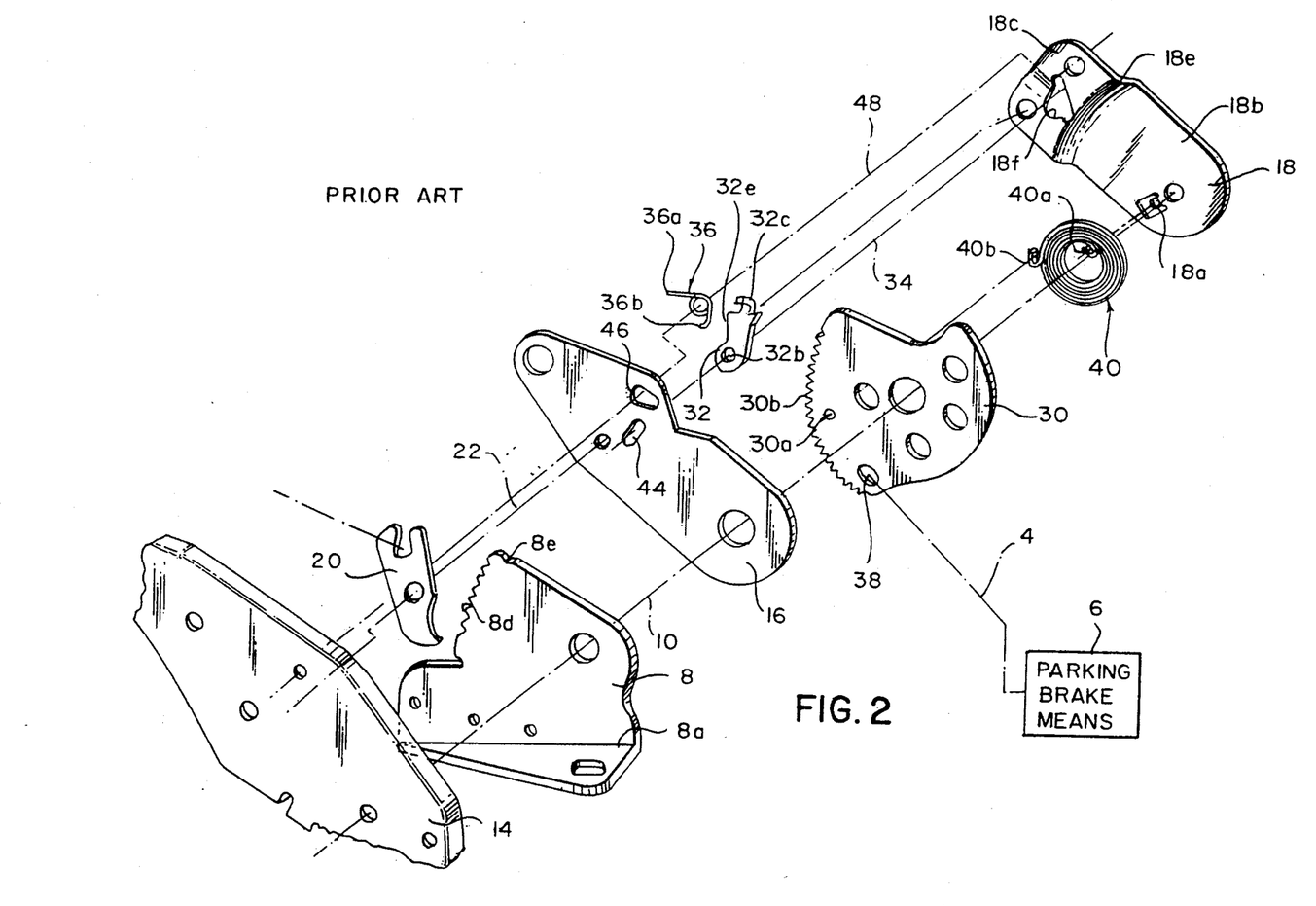

FIGS. 1 and 2 illustrate a hand-lever operated parking brake arrangement of the Boyer U.S. Pat. No. 5,001,942, including spiral spring 40 for biasing the cable adjusting ratchet 30 in a direction to apply tension to parking brake cable 4, thereby to remove slack therefrom. As discussed in the patent, when the handle means 2 is in the cable-tension released (i.e. brake-released) position relative to the stationary main pawl member 8, the lateral tab 32c of the cable tensioning pawl 32 engages the ramp surface 8e on the main ratchet 8, thereby to maintain the pawl 32 in a disengaged condition relative to its associated ratchet 30. Owing to the restoring force of spiral spring 40, the cable-tensioning ratchet 30 is rotated in a direction to remove slack from the cable 4, as is known in the art. When the operator now pivots the handle means toward the cable-tensioned (i.e. the brake-engaged) position, the tab 32c is lifted from the ramp 8e on the main ratchet member 8, and the arm 36b of spring 36 pivotally biases pawl 32 in a direction to effect engagement between pawl 32d and the teeth and ratchet member 30b. When the operating handle means is again returned toward its brake-released position, pawl tooth 32d becomes released from the cable tension ratchet 30 when the pawl tab 32c again engages the ramp surface 8e of the main ratchet.

Figure 3:
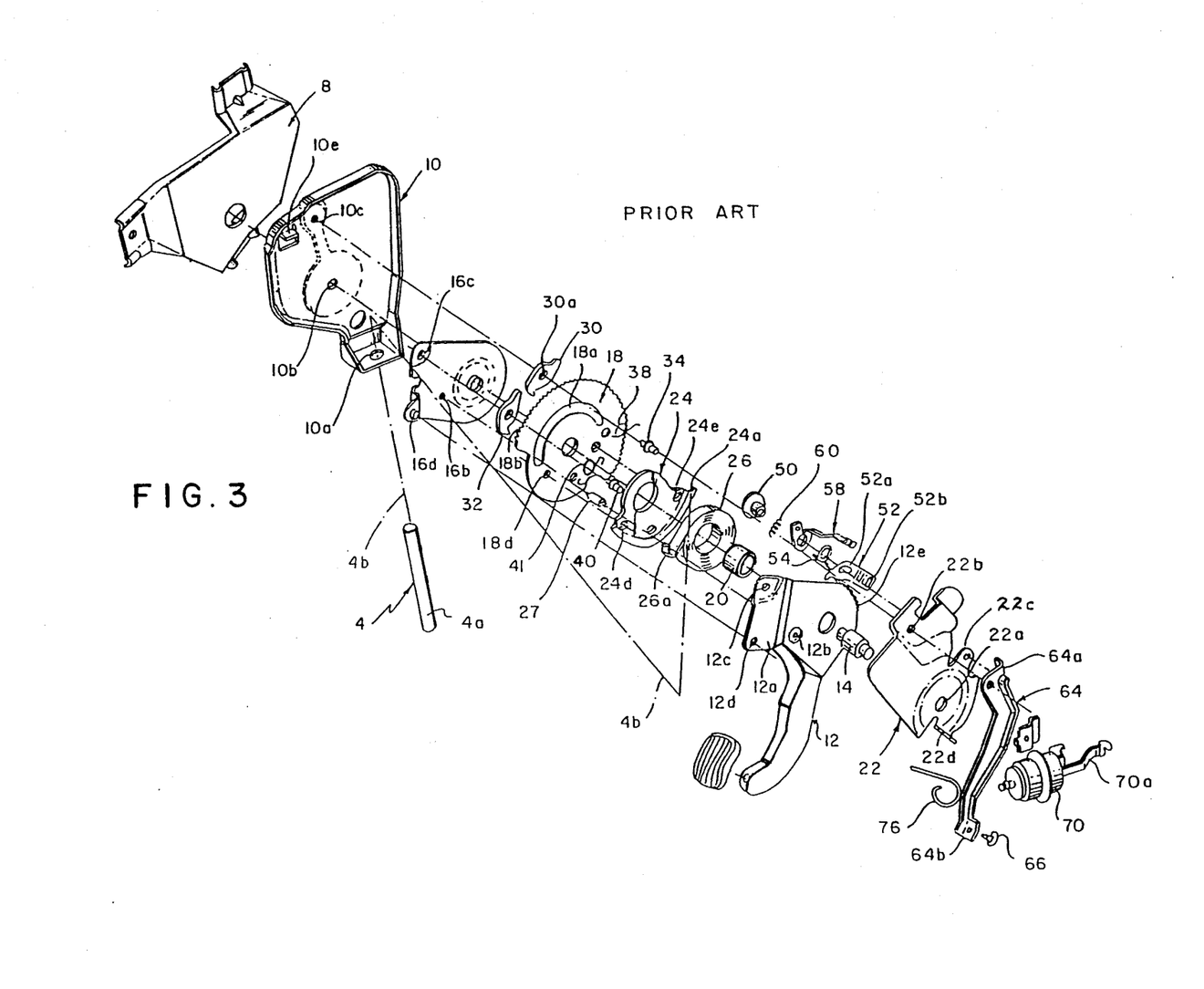
FIG. 3 is an exploded view of a prior art parking brake system of the foot-operated lever type including cable tension adjusting means.

In the foot-lever-operated parking brake system of FIG. 3—which corresponds with the system of the porter Porter et al U.S. Pat. No. 4,841,798—when the system is in the fully-released condition, the adjuster track sub-assembly 126, 124 is allowed to freely rotate in a direction so a to cause greater cable tension until a point of equilibrium is reached, thereby insuring a minimum tension and lack of cable slack at each stroke. The lock pawl 130 is held out by the lock pawl release lever 164 which is rotated to the "release position" by the pedal 112 owing to the engagement between lever 112 and button 166. The drive pawl 132 is held out of engagement with ratchet teeth 118b by a fixed tab 110e on the mounting bracket 110 thereby allowing free rotation of the self-adjuster in either the clockwise of the counter-clockwise direction. The ends 126b of the preloaded spring 126 react between the drive stud 127 and with the ratchet pivot sleeve 120, thereby to rotate the ratchet 118 and the cable tract 124 in the cable-tensioning direction relative to lever 112.

Figures 4, 5, 6, 7, 8, 9, 10:
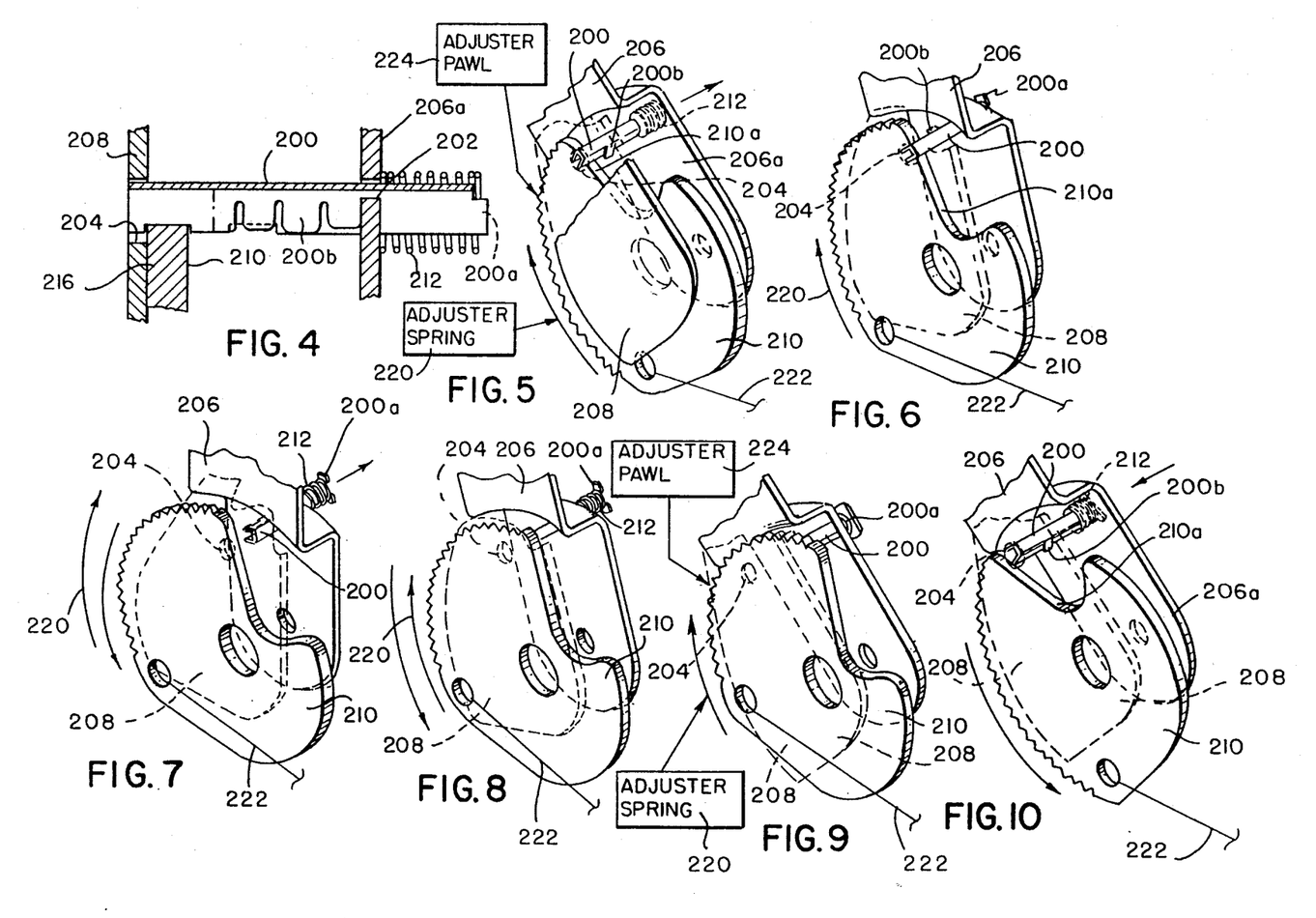
FIG. 4 is a detailed sectional view of a first embodiment of the invention including a spring-biased resettable lockout pin.
FIGS. 5-10 are detailed perspective views illustrating the operation of the lockout pin means of FIG. 4.

Referring now to FIGS. 4–10, a lockout pin 200 is provided that extends transversely between a pair of aligned openings 202 and 204 contained in the lever portion 206a of the hand-operated lever 206, and in the parallel spaced divider plate 208, respectively. The pin—which has a generally U-shaped cross section formed by folded metal—is maintained in the illustrated abutment position of FIG. 4 against the biasing force of spring 212 as a consequence of the engagement by adjuster ratchet 210 with the slot 216 defined within the opposed arm portions of the pin 200. When the apparatus is in the initial caged or locked position of FIG. 5, the adjuster ratchet is biased in the clockwise direction by adjuster spring 220, which spring is a spiral spring arranged concentrically about the pivot axis of hand-operated lever 206. Lockout pin 200 is in its abutment position with its free end extending through opening 204 contained in the divider plate 208. Adjuster ratchet 210 is biased in the clockwise direction by adjuster spring 220, thereby to cause the generally radially extending abutment surface 210a on the adjuster ratchet 210 to enter into slot 216, as shown in FIG. 4. The parking brake cable 222 is then connected with adjuster ratchet 210, and the adjuster pawl 224 is in engagement with the teeth of ratchet 210. The hand-operated lever 206 is now pivoted in the clockwise direction to progressively tension the parking brake cable 222 as shown in FIG. 6, until the tension of cable 222 exceeds that of the spring 220, whereupon the lever 206 moves in the clockwise direction relative to the adjuster ratchet 210, as shown in FIG. 7. Pin 200 is released as a consequence of the removal of adjuster ratchet 210 from the slot 216, whereupon the holdout spring 212 displaces pin 200 toward the released position, shown in FIG. 7. As shown in FIG. 8, when the lever 206 is released and returned in the counterclockwise direction, the adjuster ratchet 210 is rotated by spring 220 toward an equilibrium position defined by the tension in cable 222 and the counteracting force of adjuster spring 220, thereby to remove slack from the cable 222. During this time, the end extremity of pin 200 is maintained by holdout spring 212 out of engagement with the lateral surface of the adjuster ratchet 210. Lateral tabs 200b on the pin retain it in place on the lever against the force of spring 212. The initial slack is removed when the lever is returned to the off position, (FIG. 9), and the adjuster pawl 224 is in engagement with the teeth of the ratchet 210.

In accordance with an important feature of the invention, the apparatus is resettable to its original caged or locked condition. To this end, the adjuster ratchet 210 is rotated in a counterclockwise direction relative to the lever 206 until the abutment surface 210a on the ratchet 210 clears the opening 204 contained in divider plate 208 (FIG. 10), whereupon the pin 200 is manually inserted against the force of spring 212 to cause the end extremity of pin 200 to again enter the opening 204 contained in divider plate 208, whereupon ratchet 210 is caused to rotate in the clockwise direction to again cause the abutment surface 210a to be introduced into the slot 216 contained in pin 200.

Thus, in the caged or locked condition of FIGS. 4 and 5, a stable situation is created that is highly resistant to accidental actuation during shipment and installation.

Figures 11, 12, 13, 14, 15:
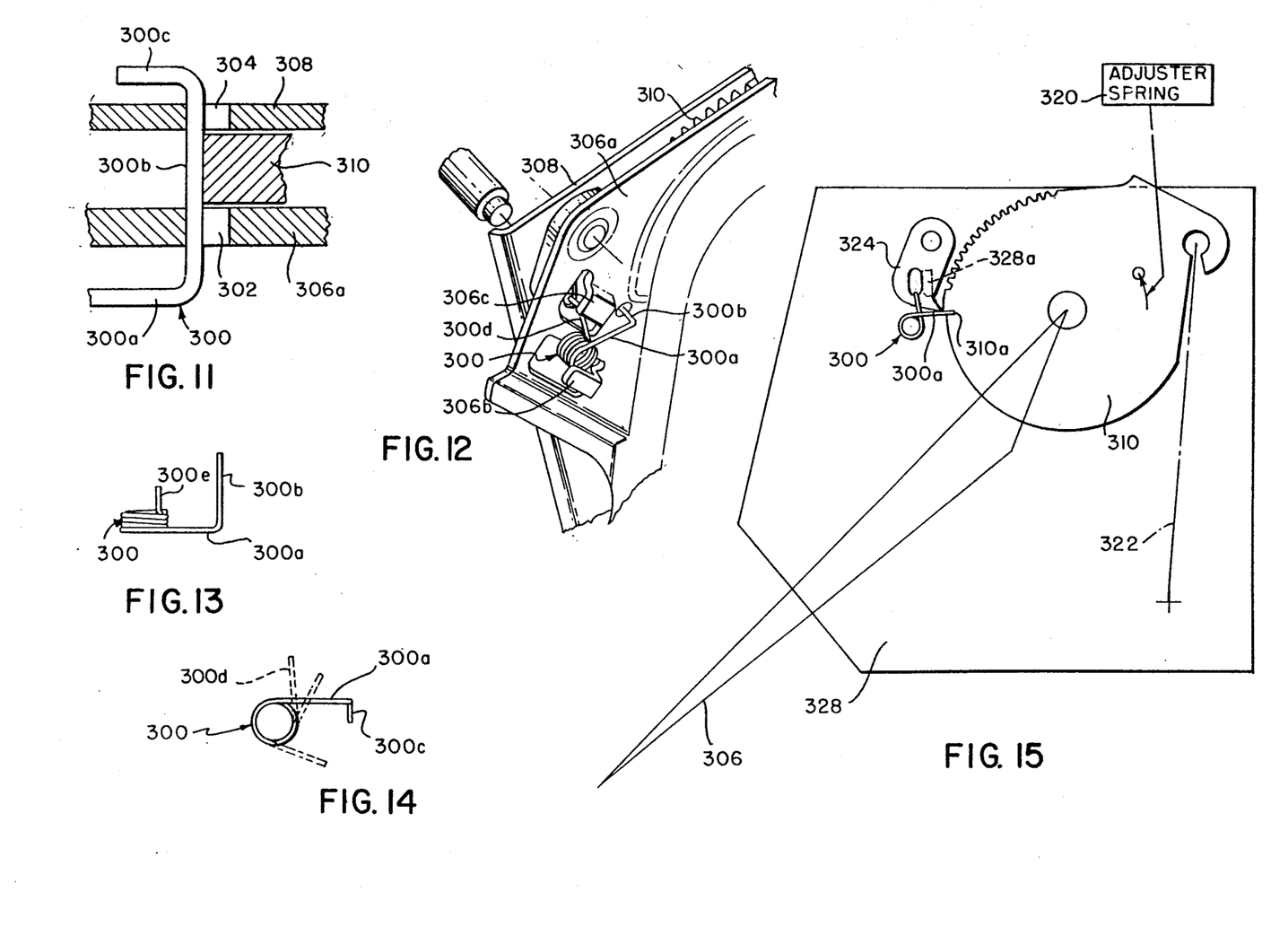
FIG. 11 is a detailed sectional view of a second embodiment of the invention including a resettable lockout spring.
FIG. 12 is a detailed perspective view illustrating the manner of mounting the lockout spring on the lever arm.
FIGS. 13 and 14 are side and end views, respectively, of the lockout spring of FIGS. 11 and 12.
FIGS. 15-21 are diagrammatic illustrations, with certain parts removed, of the operation of the spring lockout means of FIGS. 11-14.

Referring now to FIGS. 11–21, a second embodiment of the invention is disclosed which includes a lockout or holdout spring 300 operable to engage the adjuster ratchet 310 to maintain the same in a caged condition, as shown in FIG. 15. More particularly, the spring 300 is a torsion spring including, at one end as best shown in FIGS. 13 and 14, a first arm portion having a radial portion 300a, a transverse portion 300b extending axially relative to the spring, and an orthogonally arranged end portion 300c. At its other end, the spring includes a second arm portion having a radial portion 300d, and an axially directed portion 300e. The spring is mounted on the external side of the portion 306a of the foot-operated lever 306, as best shown in FIG. 12. As shown in FIGS. 11 and 12, the axially-directed portion 300b of the arm 300a extends through aligned openings 302 and 304 contained in the lever portion 306a and the divider plate 308, respectively. The axially directed portion 300b thus serves as an abutment or stop against which the ratchet abuts, as shown in FIGS. 11 and 15.

When in the initial caged or locked condition of FIG. 15, the axially directed portion 300a of spring 300 engages a corresponding slot 310a contained in the peripheral surface of the adjuster ratchet 310, thereby to prevent rotation of the adjuster ratchet 310 in the counter-clockwise direction by the spiral adjuster spring 320. In this initial condition, the adjuster pawl 324 is maintained out of engagement with the teeth of adjuster ratchet 310 by the stationary tab 328a on mounting bracket 328. During this caged or locked condition of adjuster ratchet 310 by the lockout spring 300, the parking brake cable 322 is attached to the adjuster ratchet 310.

Figure 16:
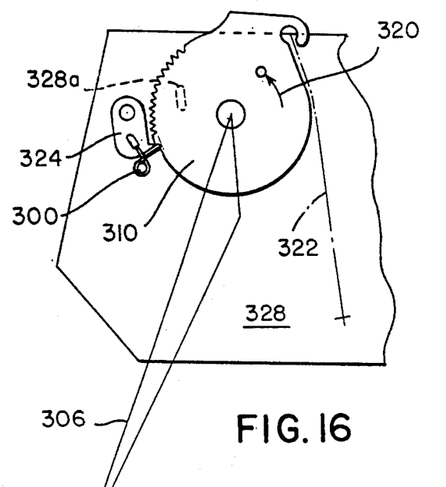
Figure 17:
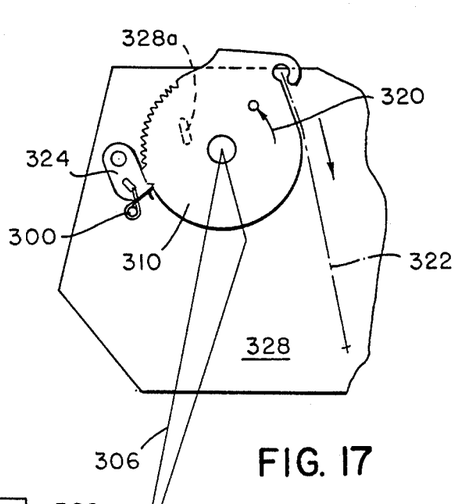
Figure 18:
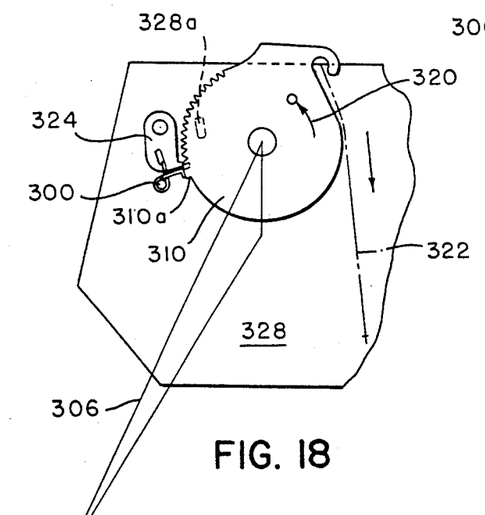
Figures 19, 20:
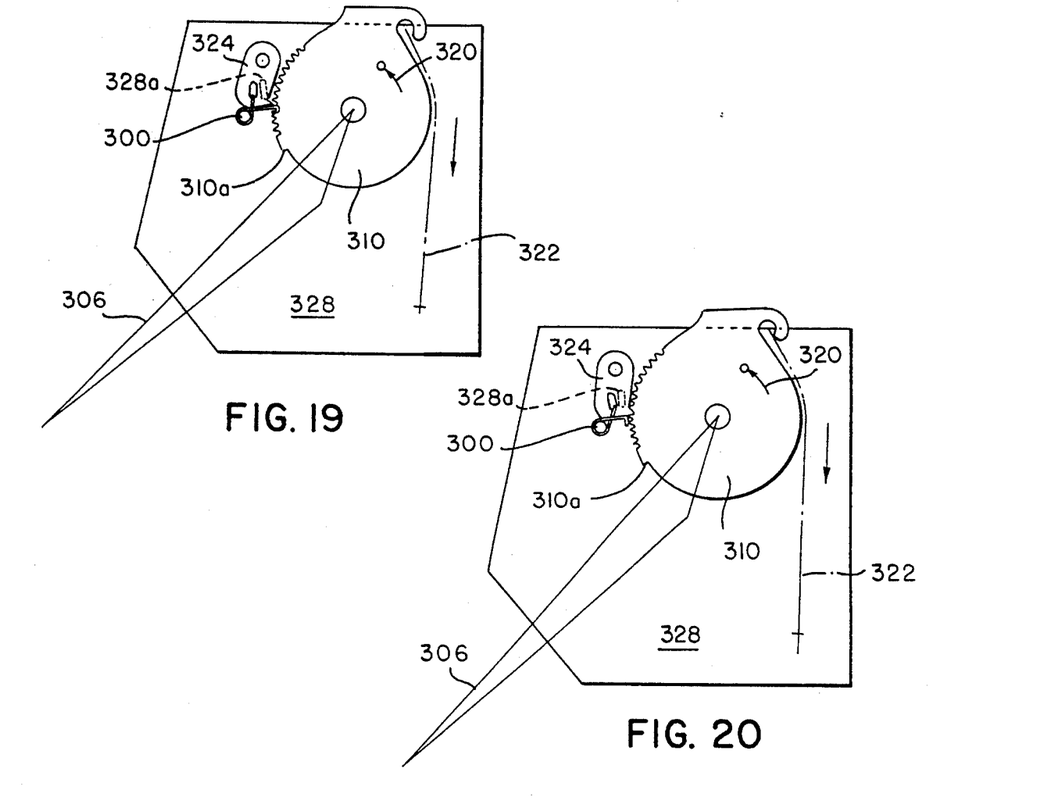

Referring now to FIG. 16, as the foot-operated lever 306 is progressively depressed, the ratchet 310 is rotated in the counterclockwise direction to progressively tension cable 322, thereby to remove slack therefrom. Upon continued rotation of the lever 306 in the counterclockwise direction, the tension of cable 322 is progressively increased until it exceeds that of the adjuster spring 320, whereupon adjuster ratchet 310 rotates in the clockwise direction to effect disengagement of the spring arm portion 300b from the corresponding notch 310a contained in the ratchet 310. The lockout spring remains in the disengaged position, clearing the teeth of the adjust ratchet, thereby allowing the ratchet to rotate freely until an equilibrium position is reached between the tension of cable 322 and the tension of the spiral adjuster spring 320. Upon release and pivotal movement of the pedal in the clockwise direction, the pawl 324 is in engagement with the teeth of ratchet 310. As indicated above, when the adjuster spring and cable tension reach equilibrium, the foot-operated lever 306 returns to its off position, and upon subsequent application of the lever, the adjust pawl 324 prevents the adjuster ratchet from unwinding, and load is applied to the system when the foot-operated lever is depressed. The adjuster spring continues to remove system slack as it develops, the apparatus being in the operating condition illustrated in FIG. 20 with the pawl 324 maintained out of engagement with the ratchet teeth by the stationary tab 328a.

Figure 21:
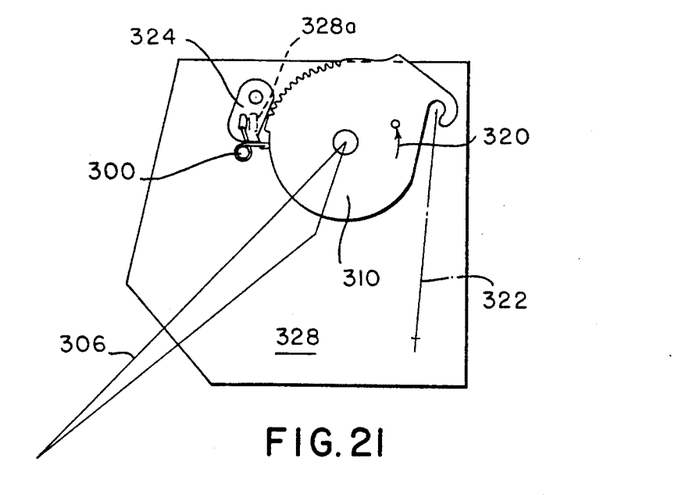
Figure 22:
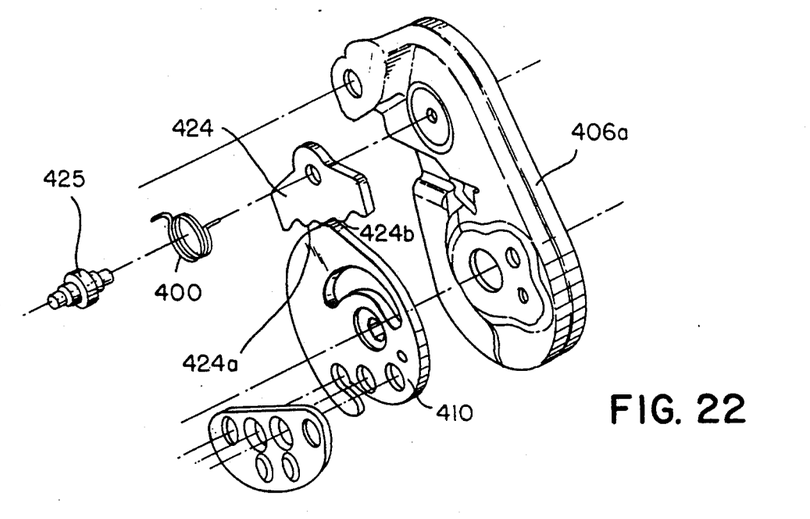
FIG. 22 is an exploded view of a third embodiment of the invention a resettable lockout pawl.

In order to reset the apparatus to the FIG. 21 condition, the adjuster ratchet 310 is rotated in the clockwise direction as far as possible, whereupon the lockout spring is rotated until it contacts the adjuster ratchet, with the arm portion 300b again in engagement with the notch 310a contained in the outer periphery of the ratchet 310. This re-establishes a stable relationship between the components, thereby allowing parking brake service.

Referring now to the third embodiment of the invention illustrated in FIGS. 22-29, the pawl 424 serves as the lockout means, thereby to avoid the requirement of extra parts. The pawl 424 is of the double-acting type including two sets of pawl teeth 424a and 424b, the pawl being connected with the hand-operated lever 406 by pivot pin 425 arranged between the two sets of pawl teeth. Of course, the system could work equally as well with a pawl having a single tooth. When in the initial caged locked condition of FIG. 23, the pawl teeth 424a engage the corresponding teeth on the adjuster ratchet 410, thereby to lock the adjuster ratchet 410 against rotation by the spiral adjuster spring 420. The adjuster ratchet 410, being driven by the spiral adjuster spring 420, traps the pawl, thereby preventing it from becoming disengaged from the adjuster ratchet. This creates a stable situation that is highly resistant to accidental actuation during shipping and installation.

Figures 23, 24, 25:
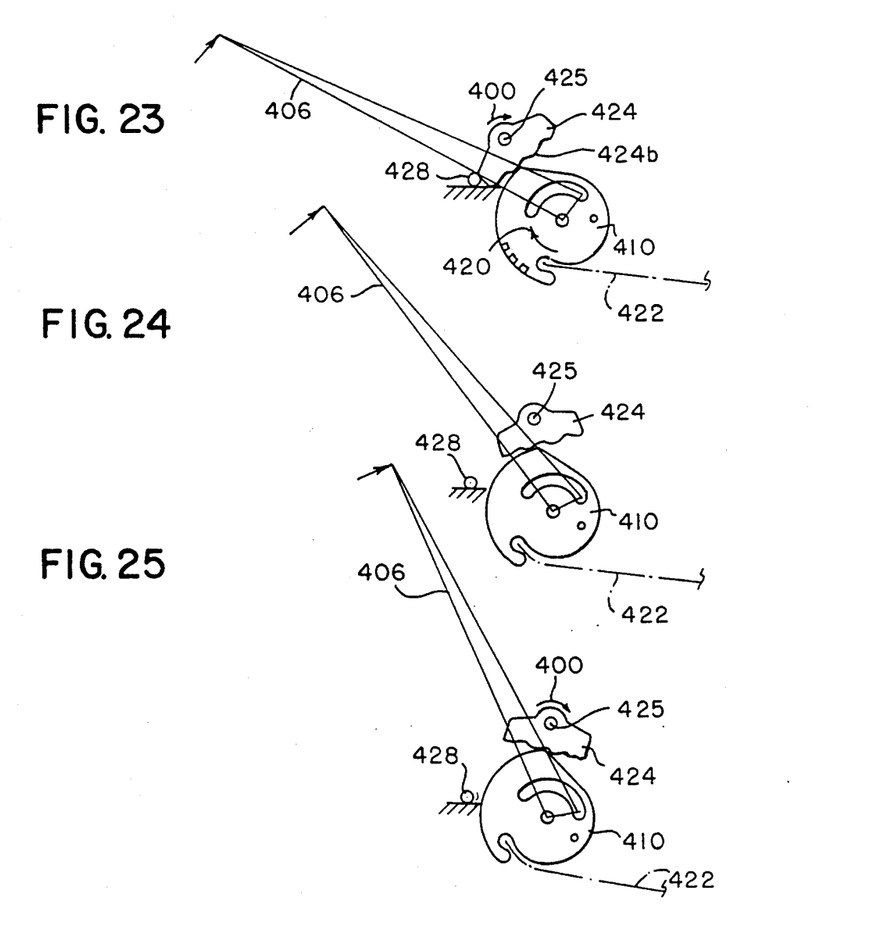
FIGS. 23-29 are diagrammatic illustrations of the operation of the embodiment of FIG. 22.

When in the caged or locked condition of FIG. 23, the pawl 424 engages a stationary pin 428 on the mounting bracket, and the parking brake cable 422 is connected with the caged or locked ratchet 410. After the apparatus has been installed in a vehicle, during initial application, the lever assembly freely rotates for installation ease. The hand-operated lever 406 is rotated in the clockwise direction, whereupon the slack is removed from cable 422, as shown in FIG. 24. Upon further rotation of the lever 406 in the clockwise direction, the tension developed in parking brake cable 422 overcomes that adjuster spring 420 to cause adjuster ratchet 410 to be rotated in the counterclockwise direction, whereupon the lockout pawl 424 is disengaged from the ratchet (FIG. 25) against the force of pawl spring 400. During initial release illustrated in FIG. 26, the lockout pawl 424 remains in the disengaged position, with the locking teeth thereof clearing the corresponding teeth of the adjuster ratchet 410. This allows the ratchet to rotate with the pawl and to operate according to normal pawl operation. The cable tension is controlled solely by the adjuster spring 420. As the lever 406 pivots in the counterclockwise direction during return to the "off" position, the adjuster spring rotates the ratchet 410 in the clockwise direction, thereby removing system slack. The adjuster spring and cable tension reach an equilibrium condition when the lever returns to the "off" position. When the lever is next applied, the adjuster pawl 424 prevents adjuster ratchet from unwinding. Then, load is applied to the system when the lever force is applied, and the adjuster continues to remove system slack as it develops. The apparatus then has its normal operating condition as illustrated in FIG. 28.

Figures 26, 27, 28, 29:
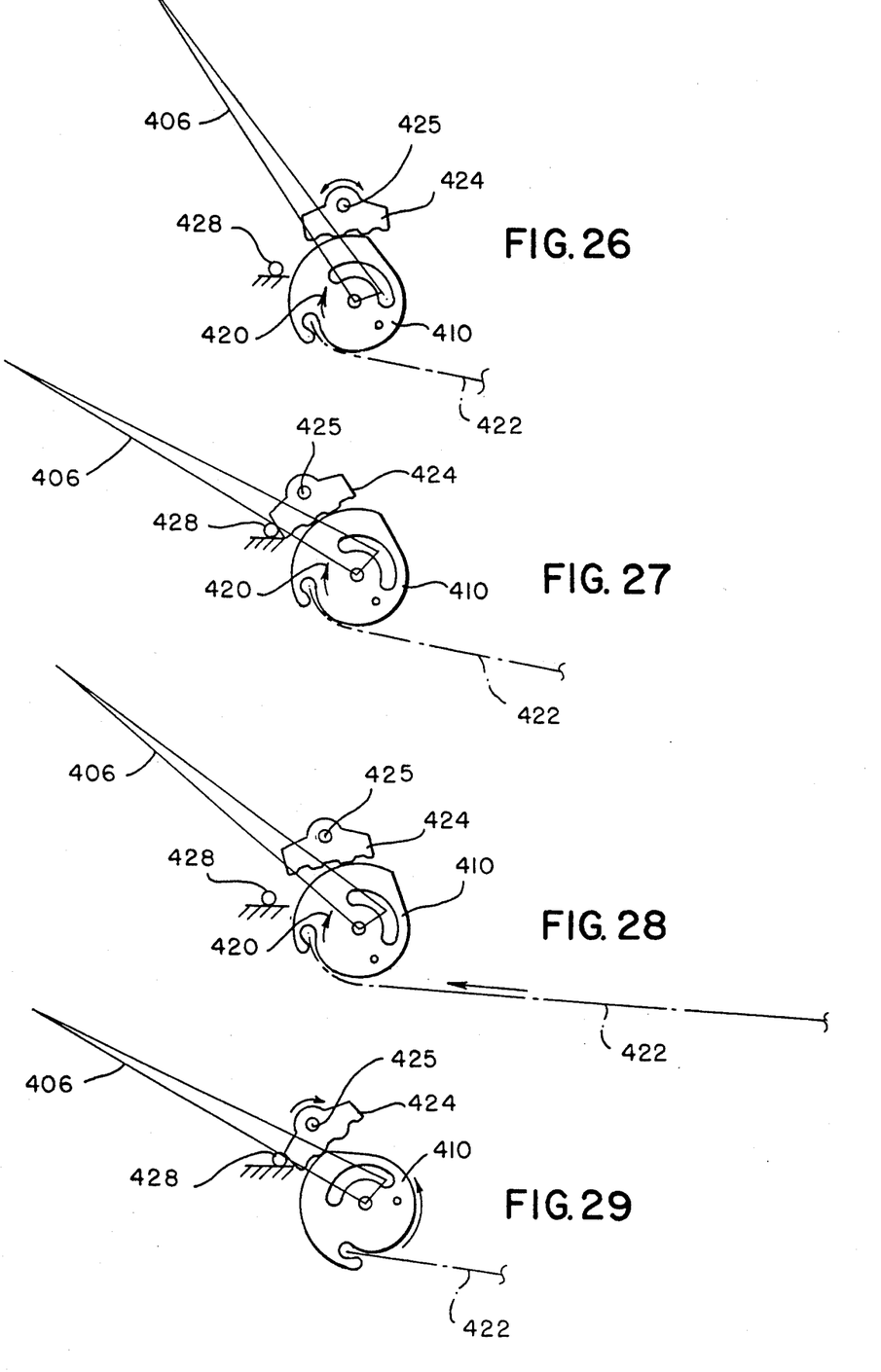

In order to reset the system, as shown in FIG. 29, the adjuster ratchet is rotated in the counterclockwise direction as far as possible, and the force of the pawl spring is overcome by pushing on the end of the adjuster pawl, in accordance with engagement by the stationary pin 428. This reestablishes a stable relationship between the components, thereby permitting service of the parking brake system.

While in accordance with the provisions of Patent Statutes we have illustrated and described the performed forms and embodiments of the invention, it would be apparent to those skilled in the art that various changes may be made without deviating from the inventive concepts set forth above.

What is claimed is:

1. A vehicle parking brake system of the type including cable tensioning means for removing slack from a parking brake cable, comprising:
    (a) a bracket;
    (b) an operating lever connected with said bracket for pivotal movement about a given axis between brake-applied and brake-released positions, respectively;
    (c) a generally disk-shaped adjuster ratchet connected with said bracket for rotation about an axis parallel with said pivot axis, said adjuster ratchet being adapted for connection with one end of the cable;
    (d) adjuster spring means rotatably biasing said adjuster ratchet with a given biasing force in a first direction about said pivot axis relative to said lever, thereby to tension said cable; and
    (e) lockout means operable in a locking condition for initially retaining said adjuster ratchet in a locked condition relative to said lever against the biasing force of said adjuster spring, thereby to permit connection of the cable with said adjuster ratchet, said lockout means being operable to a released condition when said lever is rotated toward the brake-applied condition to increase cable tension above a predetermined value relative to said spring means biasing force, thereby to release said adjuster ratchet for rotation toward an equilibrium position determined by the biasing force of said spring means and the instantaneous tension of the cable, respectively.

2. Apparatus as defined in claim 1, wherein said lockout means is resettable to said locking condition, thereby to permit disconnection of the cable from said adjuster ratchet.

3. Apparatus as defined in claim 2, wherein said lockout means includes:
    (1) a lockout pin mounted within an opening contained in a portion of said lever adjacent said adjuster ratchet for axial movement in a direction generally normal to said adjuster ratchet;
    (2) said adjuster ratchet containing a recess defining a generally radially extending abutment surface;
    (3) holdout spring means normally biasing said pin axially toward a retracted position relative to said abutment surface; and
    (4) retaining means for retaining said pin in a stop position relative to said abutment surface.

4. Apparatus as defined in claim 3, wherein said retaining means comprises a notch contained in said pin for receiving said adjuster ratchet when said pin is in said abutment position and said adjuster ratchet is in said caged position.

5. Apparatus as defined in claim 4, and further including a divider plate connected with said lever in parallel spaced relation relative to said lever portion, said adjuster ratchet being arranged between said lever portion and said divider plate, said divider plate containing an opening opposite said lever portion opening for receiving one end of said lockout pin when said pin is in said abutment position.

6. Apparatus as defined in claim 2, wherein said lockout means comprises lockout spring means connected with said lever, said lockout spring means including an arm portion operable to engage a corresponding lockout recess containing in said adjuster ratchet when said lockout means is in said locking condition, said spring arm portion being resiliently displaced out of engagement with said recess when the cable tension exceeds the tension of said adjuster spring.

7. Apparatus as defined in claim 6 wherein said lockout spring comprises a helical torsion spring having a coiled center portion and a pair of end arm portions in engagement with said lever and with said adjuster ratchet, respectively.

8. Apparatus as defined in claim 7, wherein each of said lockout spring arm portions includes a radial portion connected at one end with, and extending radially outwardly from, said spring center portion, and an axial portion extending axially from the other end of said radial portion, said spring being mounted on the opposite side of said lever from said adjuster ratchet, said lockout spring axial portions extending through corresponding openings contained in said lever, respectively, said adjuster ratchet being generally disk-shaped and having an outer peripheral surface, said lockout recess being contained in said adjuster ratchet outer peripheral surface for normal engagement by the said axial portion of one of said lockout spring arm portions.

9. Apparatus as defined in claim 8, and further including a divider plate connected in parallel spaced relation relative to said lever opposite the portion thereof that contains said openings, said adjuster ratchet being arranged between said divider plate and said lever portion, the axial portion of said one spring arm portion extending through an opening contained in said divider plate into one of said openings contained in said lever portion.

10. Apparatus as defined in claim 2, wherein said lockout means comprises:
   (1) adjuster pawl means arranged for engagement with said adjuster ratchet; and
   (2) pawl spring means normally biasing said adjuster pawl means toward engagement with said adjuster ratchet, the biasing force of said pawl spring means such that when said lever is pivoted to cause the cable tension to exceed the biasing force of said adjuster spring means, said adjuster ratchet is rotated relative to said lever to disengage said adjuster pawl means from said adjuster ratchet.

11. Apparatus as defined in claim 10, wherein said adjuster ratchet is generally disk-shaped and includes on its periphery a plurality of ratchet teeth, and further wherein said adjuster pawl means comprises a double pawl having two sets of pawl teeth, said double pawl being connected with said lever for pivotal movement in alternate directions about an axis intermediate said sets of pawl teeth.

* * * * *